Aug. 12, 1930.     H. ANDERSON     1,772,824
BAG CLOSING MACHINE
Filed July 15, 1929     12 Sheets-Sheet 9

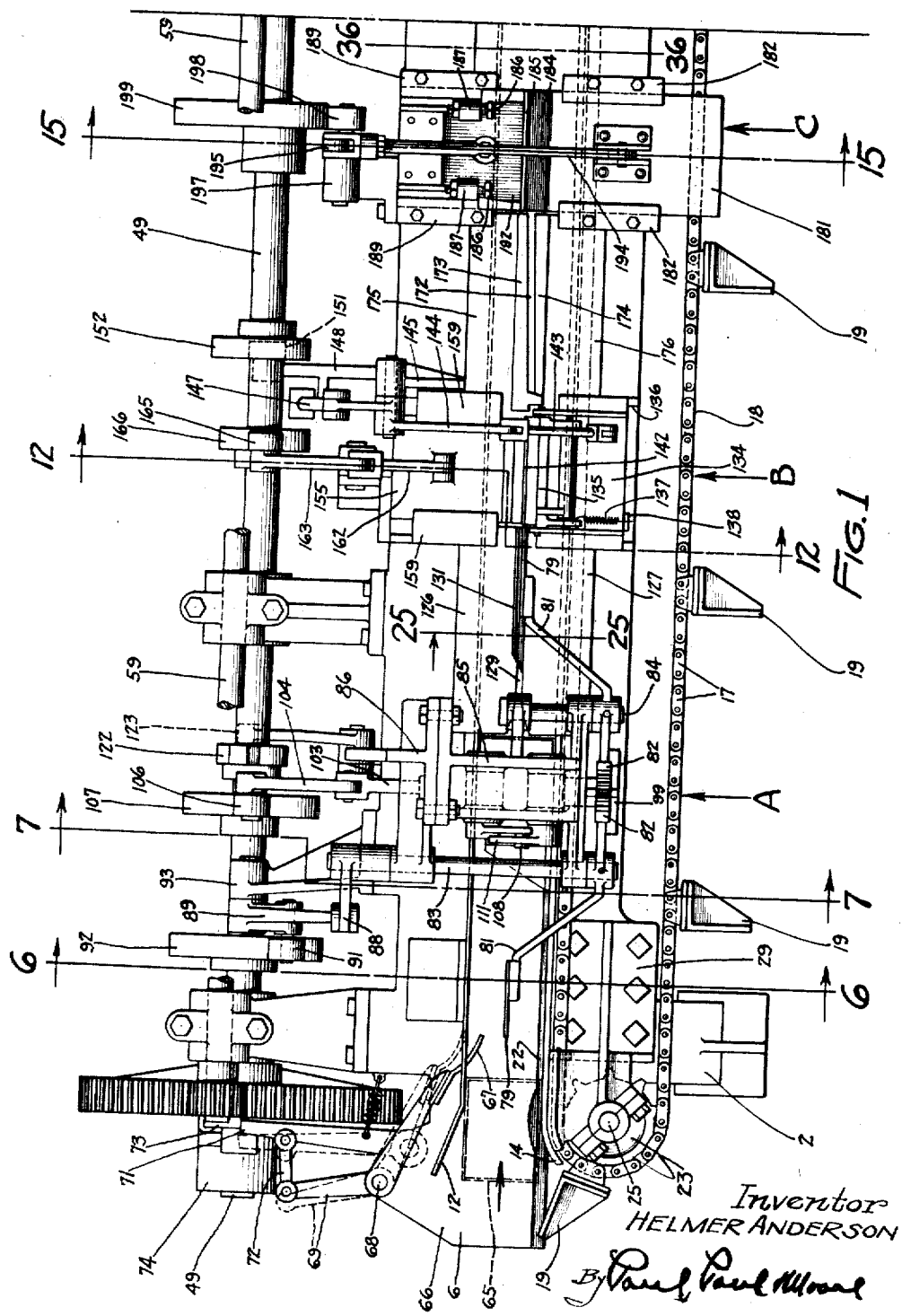

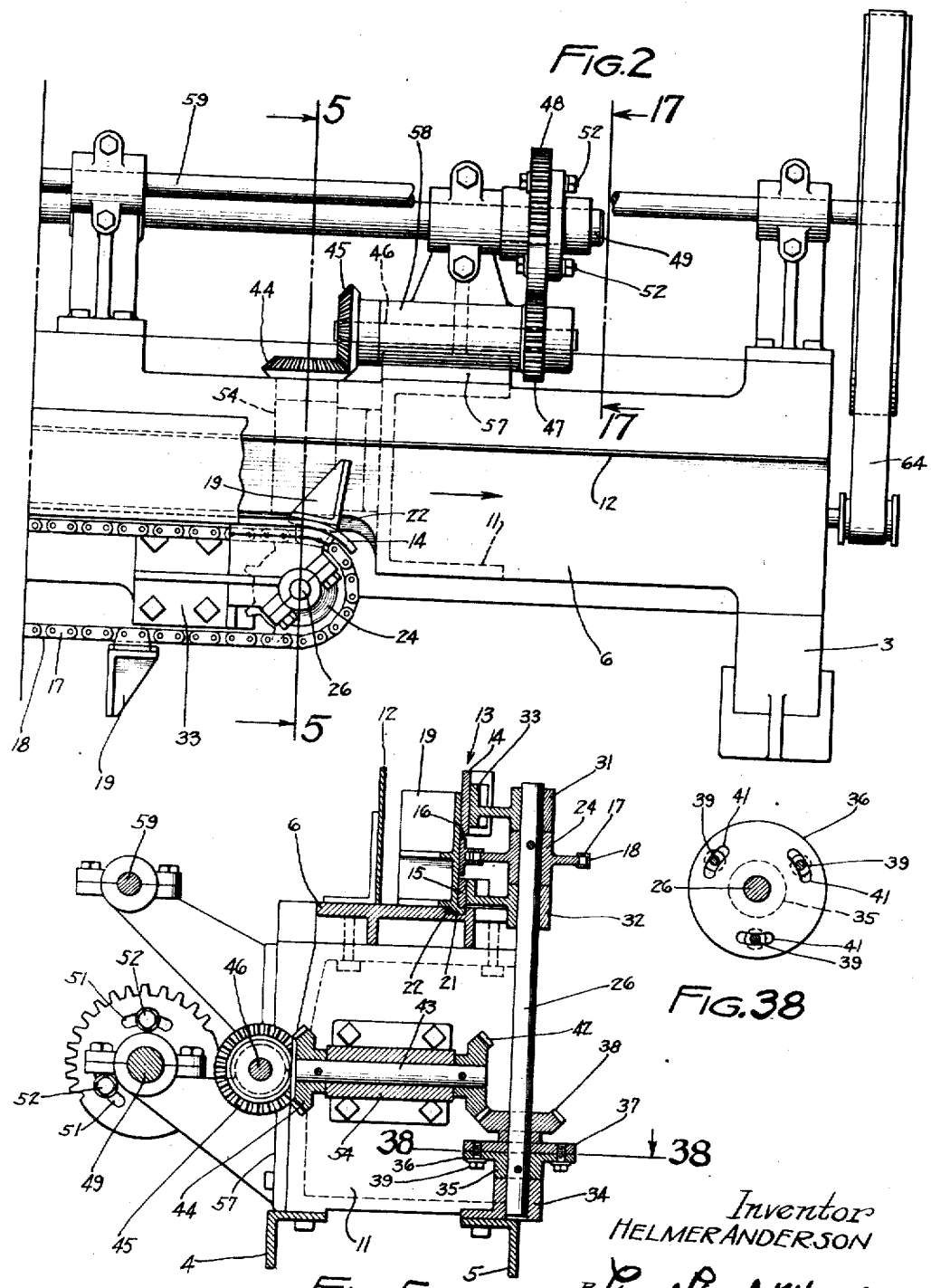

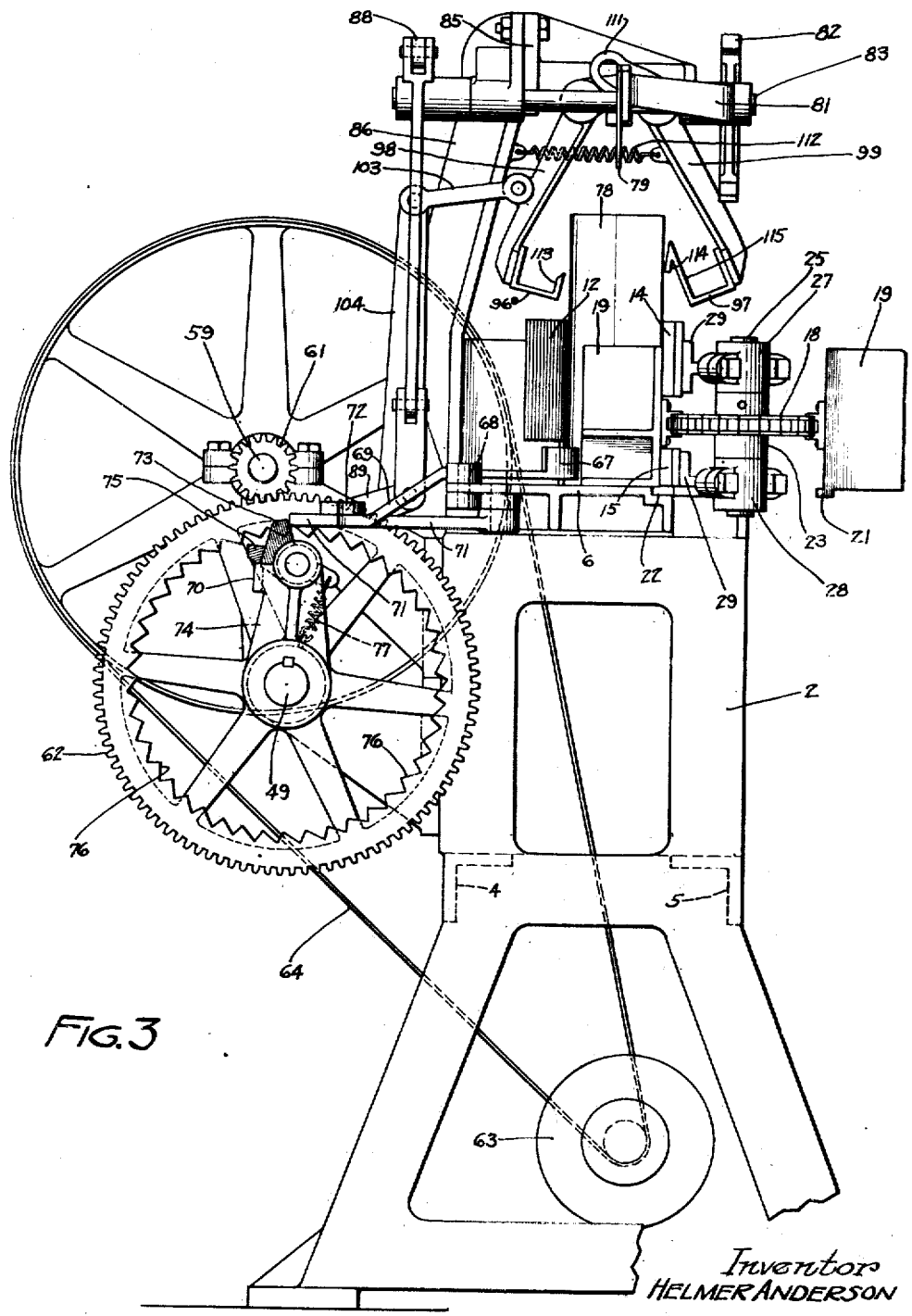

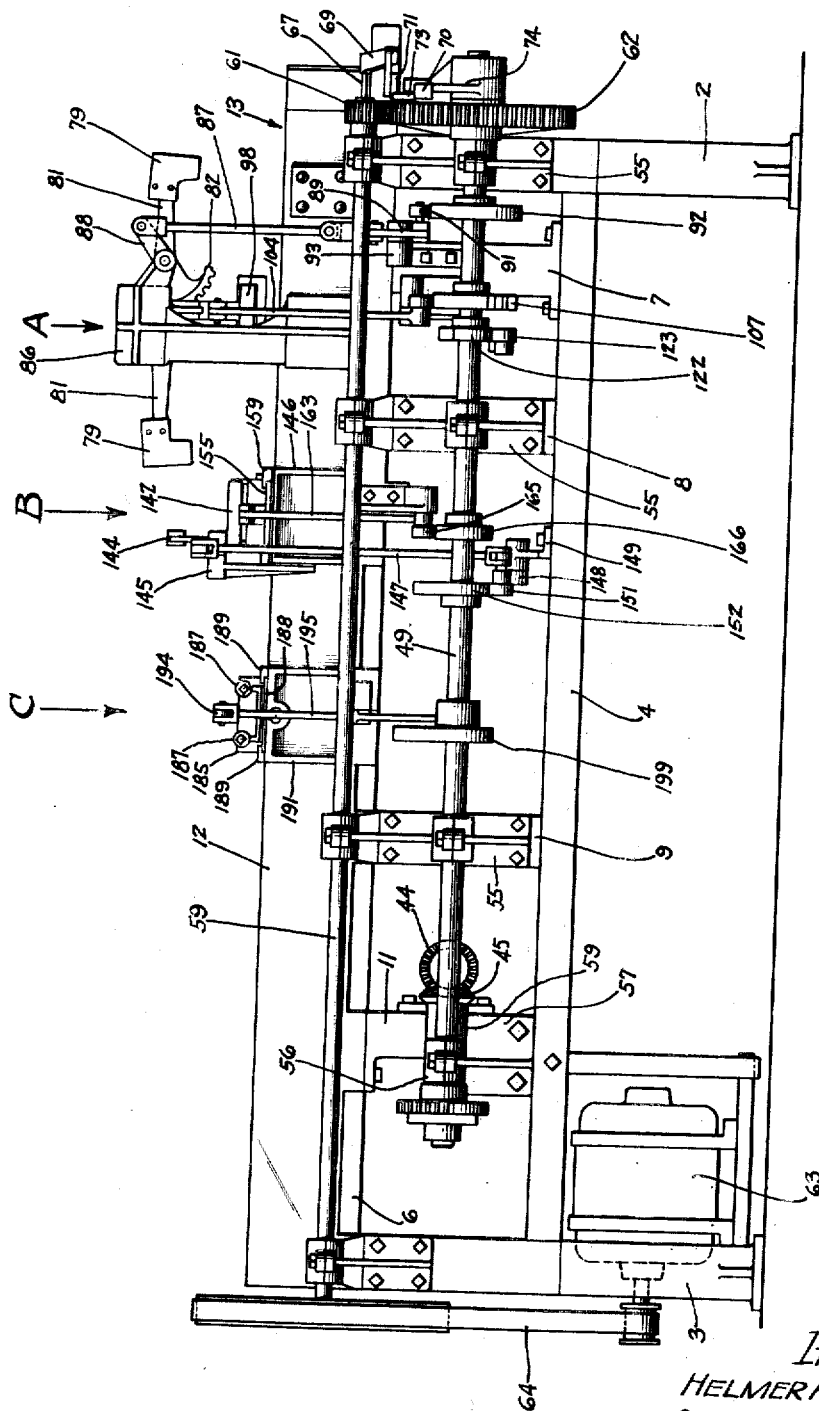

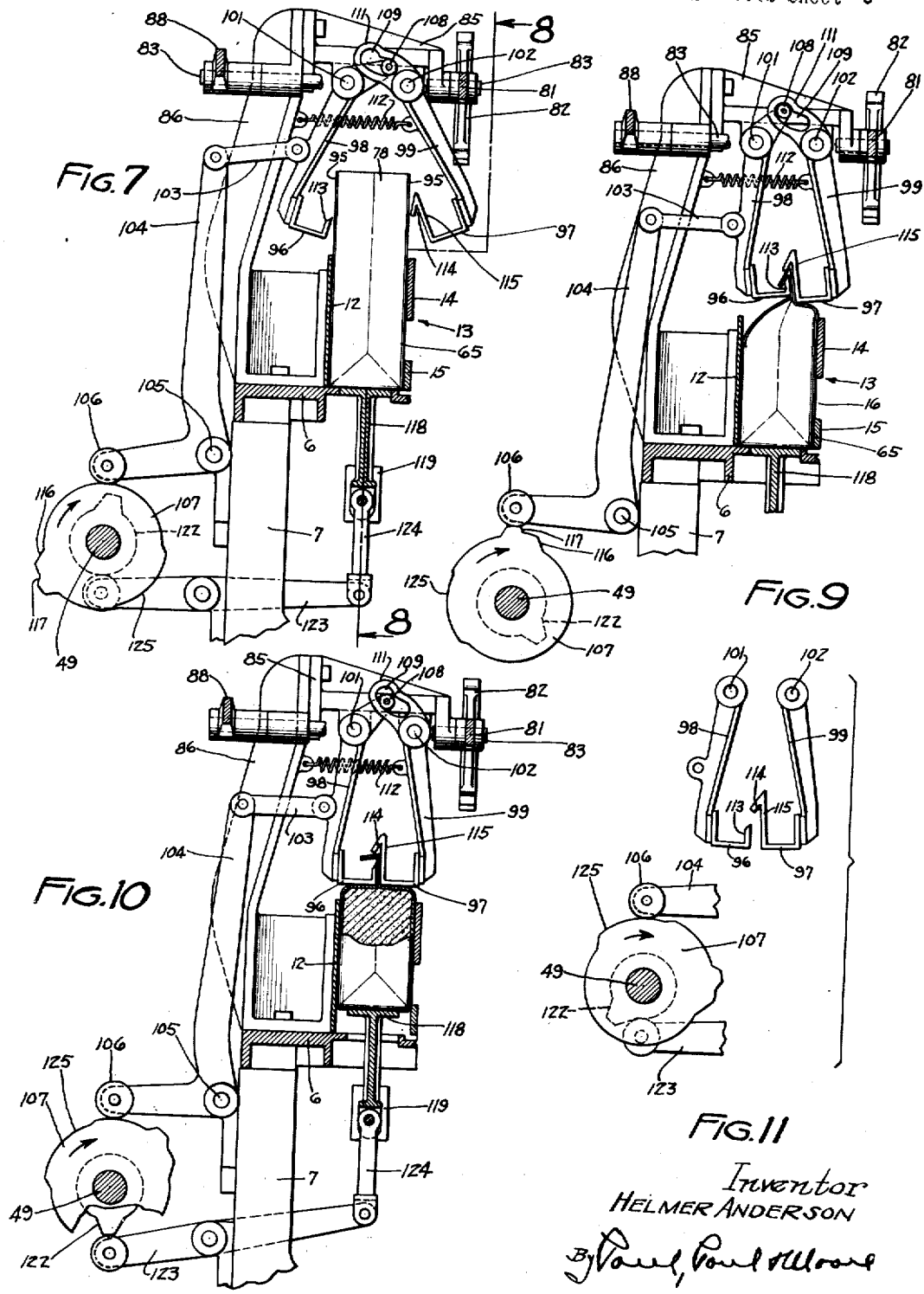

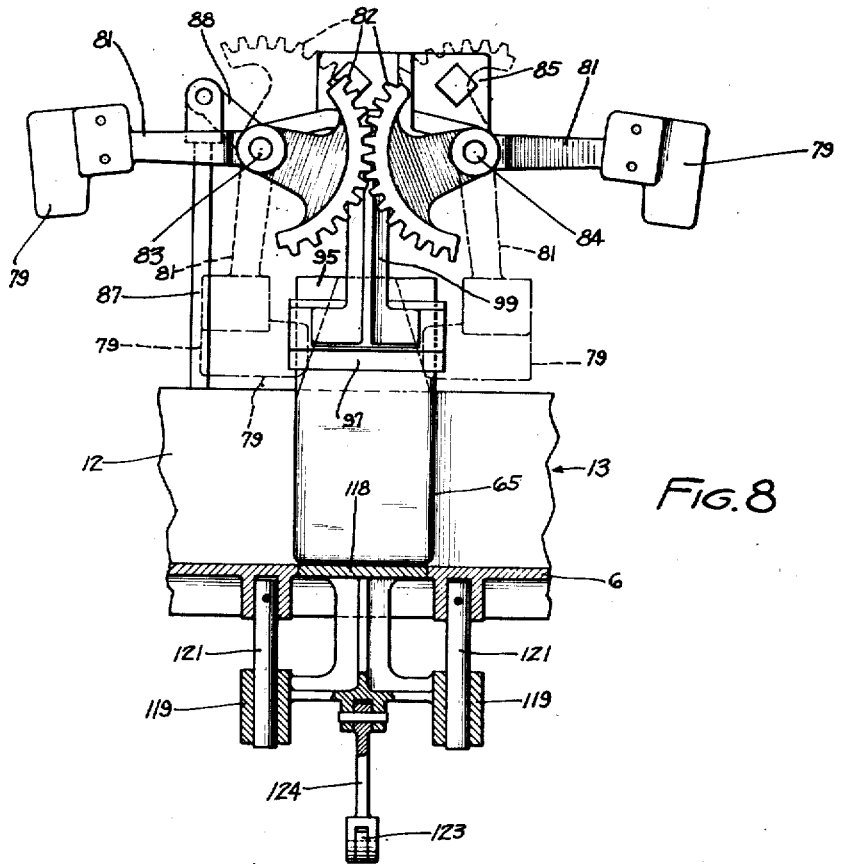
FIG. 8
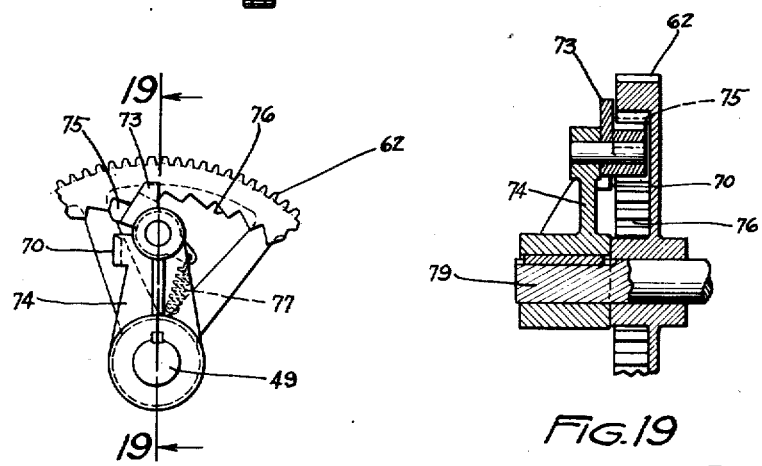
FIG. 18
FIG. 19
Inventor
HELMER ANDERSON
ATTORNEYS

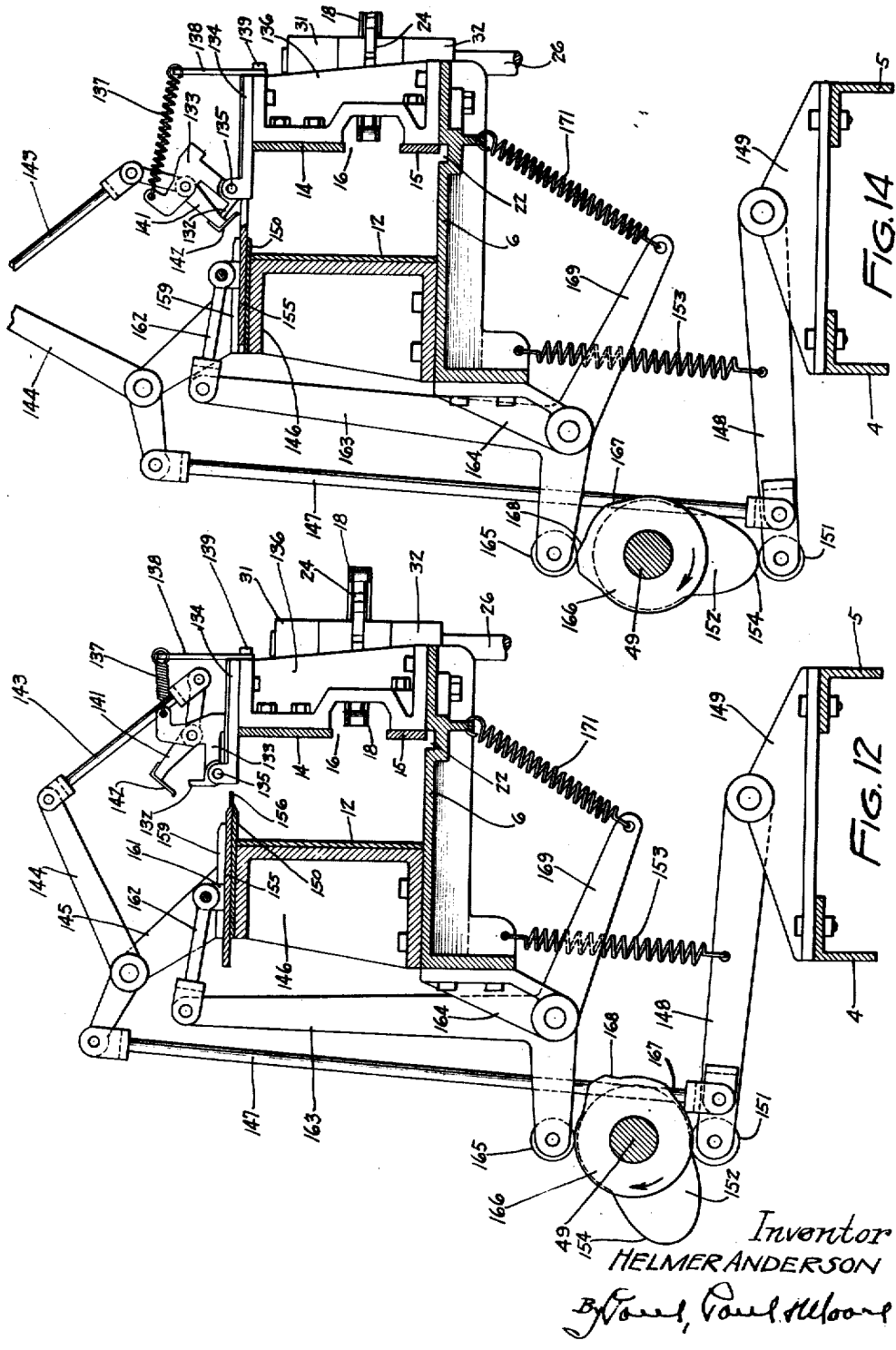

Inventor
HELMER ANDERSON
ATTORNEYS

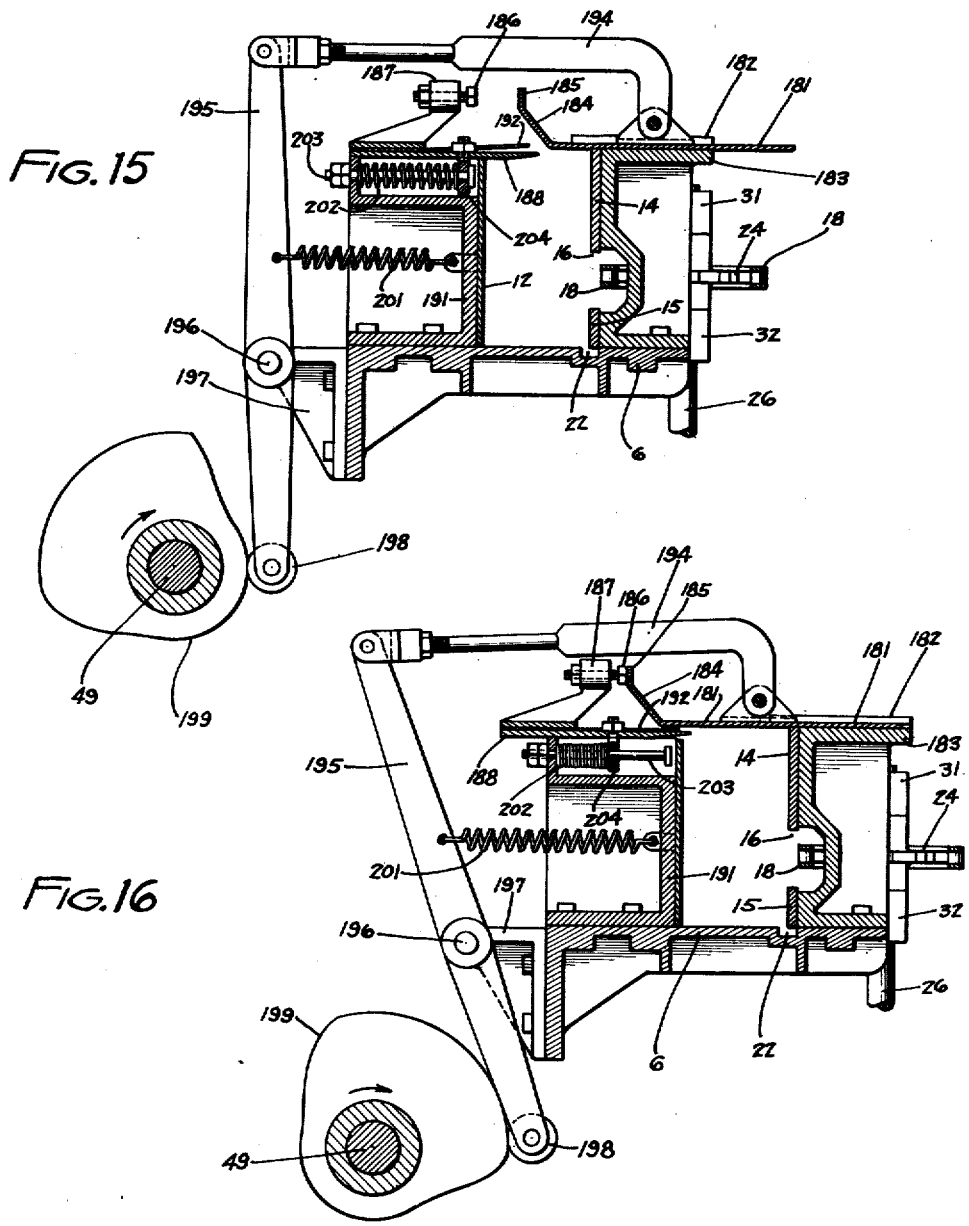

Aug. 12, 1930.    H. ANDERSON    1,772,824
BAG CLOSING MACHINE
Filed July 15, 1929    12 Sheets-Sheet 11

Inventor
HELMER ANDERSON
By Paul, Paul Moore
ATTORNEYS

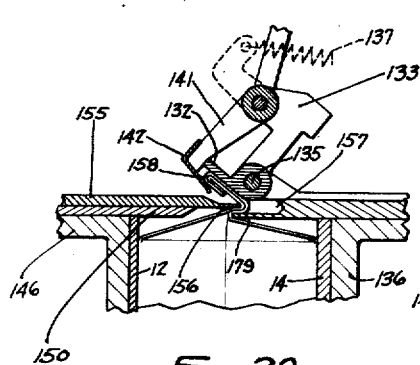

Patented Aug. 12, 1930

1,772,824

UNITED STATES PATENT OFFICE

HELMER ANDERSON, OF MINNEAPOLIS, MINNESOTA, ASSIGNOR TO GENERAL MILLS, INC., OF MINNEAPOLIS, MINNESOTA, A CORPORATION OF DELAWARE

BAG-CLOSING MACHINE

Application filed July 15, 1929. Serial No. 378,376.

This invention relates to an improved machine for closing the open tops of filled bags.

An object of the invention is to provide a machine for closing the tops of bags, particularly paper bags, having means for automatically folding the end and side walls of the bag top and preparing it for sealing, the closing of the bag mouth being such as to prevent the sifting or leakage of finely pulverized material, such as flour, from the closed bag, after it has been sealed.

A further object is to provide a bag closing machine provided with means for folding the end walls of the bag top inwardly, and thereafter pressing the side walls together and subsequently simultaneously folding the end and side walls of the bag top whereby, when the bag is sealed, there will be no danger of leakage of material from the bag.

Other objects of the invention reside in the mechanism provided for performing the first step in the operation of closing the bag top, which consists in first folding the end walls inwardly, and then pressing the side walls together with the folded end walls therebetween; the means for simultaneously folding the end and side walls of the partially closed bag top; the means for completing the final step in the operation of closing the bag mouth; and, in the general construction and arrangement of the parts of the machine.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figures 1 and 2 jointly illustrate a plan view of the entire machine;

Figure 3 is a view showing the feeding end of the machine;

Figure 4 is a view showing the back side of the machine;

Figure 5 is a sectional view on the line 5—5 of Figure 2, showing the drive for the conveyer chain;

Figure 7 is a sectional view on the line 7—7 of Figure 1;

Figure 8 is a sectional view on the line 8—8 of Figure 7, showing the means for folding the end walls of the bag inwardly;

Figure 9 is a view similar to Figure 7, showing the side closing members positioned to make the first fold in the top edge of the partially closed bag mouth;

Figure 10 is a view showing the means for shaping the partially closed bag;

Figure 11 is a diagrammatic view illustrating the positions of the side closing members when the machine is at rest;

Figure 12 is a sectional view on the line 12—12 of Figure 1, showing the means for performing the second step in the operation of closing the bag mouth;

Figure 14 is a view similar to Figure 12, with the parts in advanced positions;

Figure 15 is a detail sectional view on the line 15—15 of Figure 1, showing the mechanism for completing the closing of the bag mouth;

Figure 16 is a view similar to Figure 15, showing the positions of the parts after the bag has been closed;

Figure 18 is a fragmentary view illustrating the trip mechanism for operatively connecting the operating shaft with the drive shaft;

Figure 19 is a sectional view on the line 19—19 of Figure 18;

Figures 20, 37:
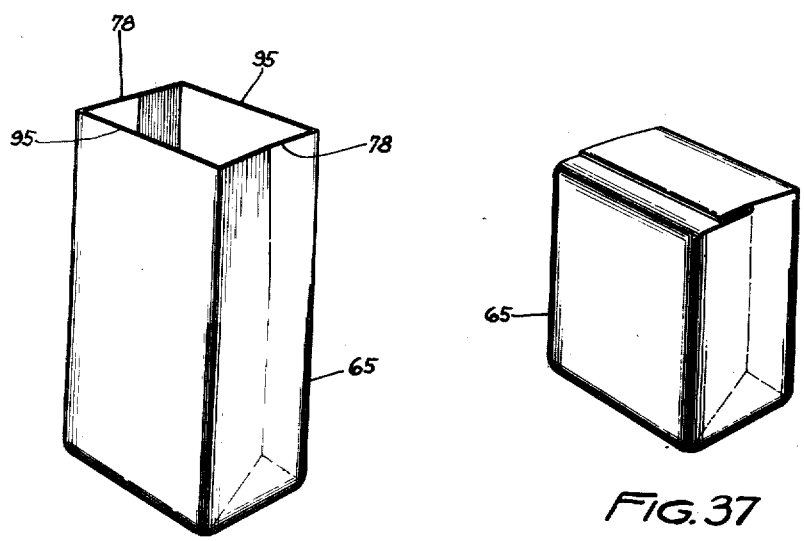
Figure 20 is a perspective view showing a bag with its mouth open.
Figure 25:
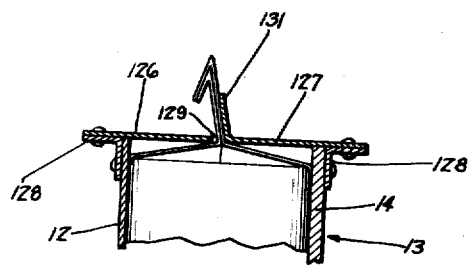

Figures 21, 22, 23, and 24 are enlarged fragmentary views illustrating the various steps involved to complete the first operation of closing the bag mouth;

Figure 25 is a detail sectional view on the line 25—25 of Figure 1, showing the first fold completed;

Figures 26, 27, 28, and 29 are fragmentary views illustrating the mechanism and the various steps involved to complete the second operation of closing the bag mouth;

Figures 30, 31, and 32 are fragmentary views illustrating the means for positioning the partially closed bag top preparatory to being delivered to the mechanism for completing the third or final operation of closing the bag mouth;

Figures 33, 34, and 35 illustrate the mechanism for performing the third or final operation of closing the bag mouth;

Figure 36 is a detail sectional view on the line 36—36 of Figure 1, illustrating a means for retaining the closed bag top in folded position while being delivered to a suitable sealing means;

Figure 37 is a perspective view showing a bag with its top or mouth closed; and

Figure 38 is a sectional plan view on the line 38—38 of Figure 5.

Machine frame

The machine frame, as here shown, comprises end members 2 and 3 connected together by longitudinally extending rails 4 and 5, and a bed plate 6 having its end portions supported upon the frame members 2 and 3. The intermediate portion of the bed plate 6 is supported upon the rails 4 by means of suitable standards 7, 8, 9, and 11, shown in Figure 4. The above parts are all suitably bolted together and provide a rigid frame structure adapted to support the operating mechanism of the machine.

Conveyer

The top surface of the bed plate 6 constitutes the bottom of a conveyer, having side walls 12 and 13, the former preferably extending substantially the full length of the machine, as shown in Figures 1 and 2. The side wall 13 of the conveyer is shown composed of upper and lower members 14 and 15, respectively, spaced apart to provide a longitudinally extending slot 16 in which the links 17 of a conveyer chain 18 travel, as shown in Figures 3 and 5. Suitable flights 19 are secured to the links 17 and are adapted to travel between the side walls 12 and 13 of the conveyer, as shown in Figure 5. Each flight has a depending tongue 21 adapted to travel in a longitudinal groove 22 provided in the face of the bed plate 6. This tongue and groove functions to guide the flights 19 as they travel between the walls of the conveyer. The conveyer chain 18 is supported upon sprockets 23 and 24, mounted respectively upon a stub shaft 25 and a drive shaft 26. The stub shaft 25 is mounted in suitable bearings 27 and 28, provided on a bracket 29 secured to the bed plate 6, as shown in Figures 1 and 3. The drive shaft 26 is supported in bearings 31 and 32, provided on a bracket 33, also secured to the bed plate 6, adjacent the rear end thereof. The lower end of the shaft 26 is supported in a bearing 34 secured to the frame member 5.

The conveyer drive shaft 26 has a collar 35 secured thereto adjacent to the bearing 34, as shown in Figure 5. This collar has a flange 36 adapted to be adjustably secured to a flange 37 secured to a pinion 38 mounted upon a shaft 26, as shown. The two flanges are secured together in adjusted relation by means of screws 39, here shown received in threaded engagement with the flange 37 and traversing slots 41 provided in the flange 36 of the collar 35. The adjustment provided between the collar 35 and pinion 38 provides means for adjustment of the sprocket chain 18 for alining the flights 19 with the bag closing mechanisms.

A bevel pinion 42 meshes with the pinion 38, and is secured to one end of a shaft 43, to the opposite end of which a similar pinion 44 is mounted. The pinion 44 is operatively engaged with a drive pinion 45, provided upon a short stub shaft 46 having an intermittent pinion 47 secured thereto which is operatively engaged with an intermittent gear 48, adjustably secured to a main operating shaft 49 by means of slots 51 and bolts 52, the latter being supported in a flanged collar 53 secured to the shaft 49. The shaft 43 is supported in a suitable bearing bracket 54 secured to the standard 11.

The operating shaft 49 is supported in suitable split bearing brackets 55 secured to the standard 2 and members 8 and 9, and a bearing 56 provided on a bracket 57 secured to the standard 11 and on which bracket a bearing 58 supporting the stub shaft 46, also is supported. (See Figures 2, 4, and 5.) The operating shaft 49 is driven from a drive shaft 59 by means of a pinion 61 and gear 62, secured respectively to the shafts 59 and 49, as shown in Figure 4. The drive shaft 59 is here shown driven from a motor 63 by means of a suitable belt drive 64.

Operating mechanism

The bag 65, after having been filled with flour, or some other material, is delivered to the receiving end 66 of the conveyer as indicated in dotted lines in Figure 1, and moved forwardly until it engages a trip 67, whereupon the conveyer chain will be started and one of the flights 19 will engage the bag and move it to the first folding mechanism, which will subsequently be described.

The trip 67 is pivotally mounted on a shaft 68 secured to the bed plate 6. This trip lever has a rearwardly extending arm 69 operatively connected with a latch 71 by means of a link 72, shown in the upper left hand corner of Figure 1. The latch 71 is adapted to be engaged by a dog 73, pivotally mounted upon an arm 74 which is terminally secured to the operating shaft 49, as shown in Figures 3 and 4. The dog 73 has a detent 75 adapted to be moved into engagement with an internal ratchet 76. When the latch 71 is moved out of the path of the dog 73, the spring 77 will move the detent 75 into driving engagement with the internal ratchet 76 on the gear 62, as shown in Figure 18, whereupon the operating shaft 49 will be rotated one revolution, because of the pinion 59 being engaged with the gear wheel 62. When the operating shaft 49 thus becomes operatively connected with the gear wheel 62, the conveyer chain 18 will be actuated to feed the bag 65 forwardly to the first station, indicated by the letter A in Figures 1 and 4. A stop 70 on the arm 74 limits the counter-clockwise movement of the dog 73 when in the position shown in Figure 3.

*Bag closing mechanism (first step) (Figures 6 to 11 and 21 to 24)*

Three steps are involved to complete the closing of each bag top, and each step is performed by a different mechanism. These mechanisms are spaced apart along the conveyer, and operate in timed relation, and only when the bags are at rest in the conveyer. To simplify the description, these mechanisms will hereinafter be referred to as stations A, B, and C, as indicated in Figures 1 and 4.

Figure 6:
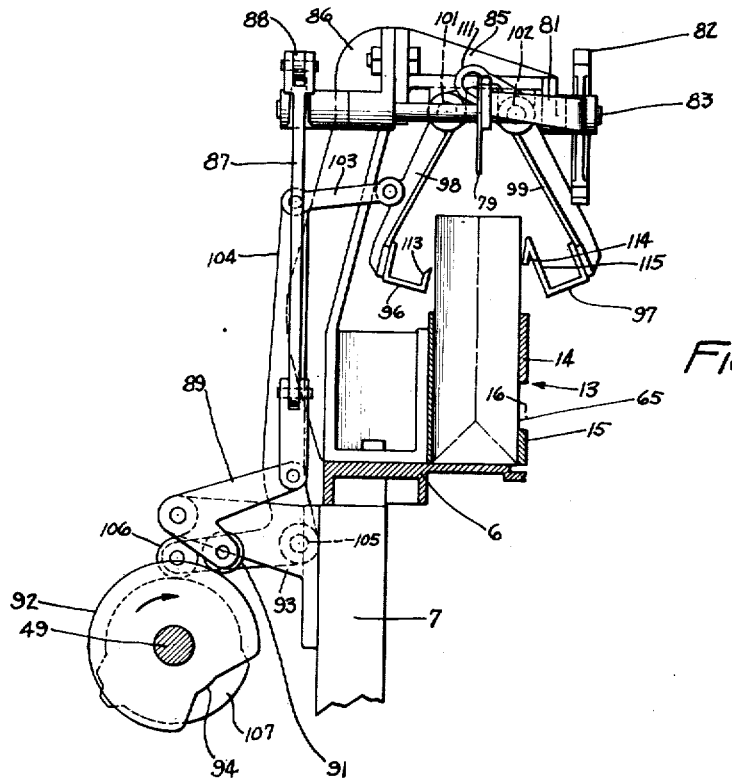
Figure 6 is a sectional view on the line 6—6 of Figure 1, showing the means for closing the side walls of the bag, and a bag positioned therebetween.
Figure 17:
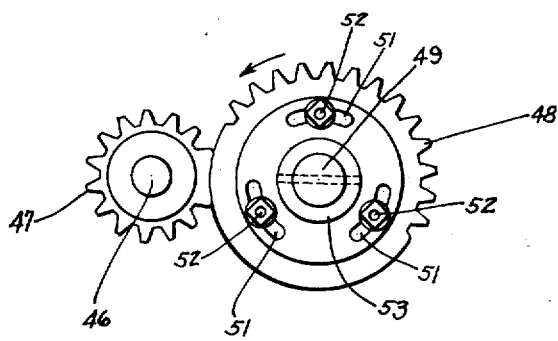
Figure 17 is a fragmentary view on the line 17—17 of Figure 2, showing the gear drive for intermittently operating the conveyer.

In the first step involved in the operation of closing the bag top, the end walls 78 of the bag are folded inwardly by means of a pair of end folding plates 79, terminally secured to arms 81 adapted for simultaneous operation by means of intermeshing gear segments 82 which are secured to the arms 81. The arms 81 are suitably secured to a pair of shafts 83 and 84, supported in a bracket 85, secured to the upper end of an upright bracket 86, the lower portion of which is suitably secured to the bed plate 6, as best shown in Figure 6.

The arms 81 are operated by means of a connecting rod 87, having its upper end operatively connected to the shaft 83 by means of a crank arm 88, and having its lower arm pivotally connected to one end of a bell crank 89. The opposite end of the bell crank is provided with a cam roller 91 adapted to roll on a cam 92, secured to the operating shaft 49. The bell crank 89 is pivotally supported upon a bracket 93 secured to the standard 7, as shown in Figure 6. The periphery of the cam 92 is provided with a low portion 94 which, when engaged by the roller 91, will cause the bell crank 89 to swing downwardly, thereby causing the arms 81 to swing to the dotted line positions shown in Figure 8, with the result that the plates 79 will engage the end walls 78 of the bag mouth and fold them inwardly, as clearly shown in Figure 21, after which the arms 81 will be returned to their normal positions, shown in full lines in Figure 8.

Figure 21:
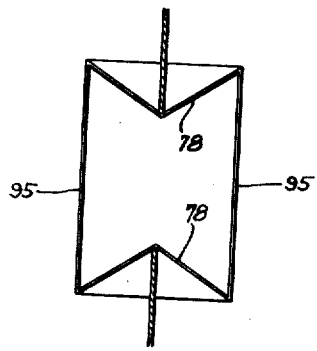
Figure 22:
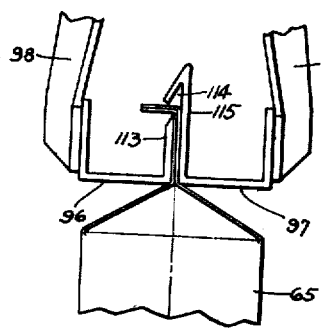
Figure 23:
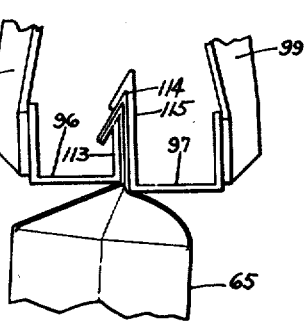
Figure 24:
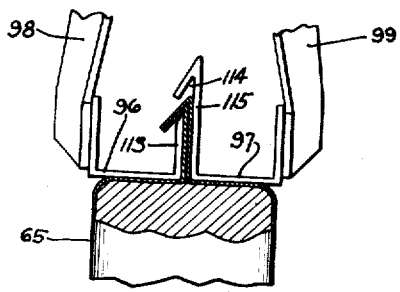

As soon as the end walls of the bag have been folded inwardly, as shown in Figure 21, the side walls 95 of the bag are folded inwardly by a pair of side wall closing members 96 and 97, shown in Figures 6, 7, 9, 10, and 11. These side closing members are supported upon depending arms 98 and 99, respectively, pivotally supported upon the bracket 85 by means of pivots 101 and 102. The arm 98 has a link 103 connecting it with the upper end of a bell crank 104 which is pivotally connected at 105 to the standard 7. A cam roller 106 is provided on the bell crank 104 and is adapted to travel on the periphery of a cam 107, also secured to the operating shaft 49. As the cam 107 rotates, the arm 98 will be oscillated upon the pivot 101, as will subsequently be described.

The arm 99 is operatively connected to the arm 98 and adapted for simultaneous movement therewith by means of a roller 108, secured to an extension provided upon the arm 98 and received in an irregular shaped slot 109 provided in an extension 111, secured to the upper end of the arm 99. A tension spring 112 has one end secured to the arm 99 and its opposite end to the upright bracket 86 in a manner to constantly urge the arm 99 in a direction towards the bag mouth.

The side wall closing member 96 has an upstanding flange 113 adapted to be received in a V-shaped groove 114 provided in an upstanding flange 115 integrally formed with the side wall closing member 97. The side wall closing members 96 and 97 and their respective flanges 113 and 115, are so related that when the cam 107 is rotated, the cam face 116 will engage the roller 106 and oscillate the bell crank 104 until the side closing members assume the positions shown in Figure 22, wherein it will be seen that the side walls of the bag are firmly clamped between the flanges 113 and 115 of the members 96 and 97, respectively. The cam face 117 then engages the roller 106, as shown in Figure 9, causing the two arms 98 and 99 to be oscillated slightly to the right, to the positions shown in Figure 9, whereby the upper edge of the flange 113 of the arm 98 will be received in the groove 114 of the flange 115, thereby causing the upper marginal portion of the partially closed bag mouth to be folded to the position shown in Figure 23. The upward movement of the flange 113 into the groove 114 will cause the walls of the bag to be sufficiently creased or scored to cause the bag walls to substantially retain the folded positions, shown in Figures 24 and 25, when the arms 98 and 99 return to their central clamping positions, shown in Figures 10 and 24.

Before the flanges 113 and 114 of the side wall closing members 96 and 97 release their grip upon the partially closed bag mouth, the bag is moved upwardly by the upward movement of a bag supporting member 118, thereby compressing the bag between the members 96 and 97, and the upper surface of the supporting member 118, whereby the bag is shaped. The bag supporting member 118 is provided with spaced guides 119, slidably mounted upon depending rods 121 secured to the bed plate 6, as best shown in Figure 8.

The member 118 is operable by means of a cam 122 secured to the operating shaft 49, and which is adapted to operate one end of an arm 123, the opposite end of which has a link 124 connecting it with the member 118 as best shown in Figure 10. As soon as the member 118 has been moved upwardly to compress the bag between it and the side wall closing members 96 and 97, the bag supporting member 118 is returned to its normal position, as shown in Figure 8, whereupon the roller 106 of the bell crank 104 engages the low portion 125 of the cam 107, thereby causing the side wall closing members 96 and 97 to be moved to the positions shown in Figure 11, whereby they will release their grip upon the walls of the bag mouth and thus complete the first step in the operation of closing the bag mouth.

*Second step (Figures 12, 13, 14, 26, 27, 28 and 29)*

Upon the completion of the first operation, the bag is delivered to station B, where the second operation of closing the bag mouth is performed.

Figure 26:
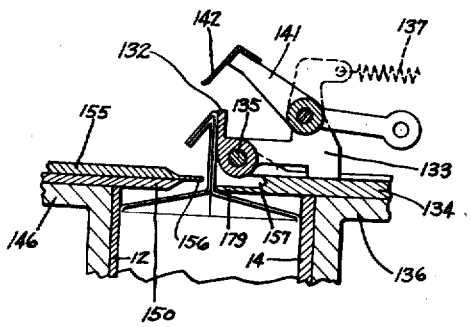

The portion of the conveyer between stations A and B is partially closed by means of plates 126 and 127, here shown secured to the side walls 12 and 13 of the conveyer by suitable angle irons 128. A slot 129 is provided between the adjacent edges of the plates 126 and 127 adapted to receive the partially closed bag mouth as it travels from station A to station B. The plate 127 has an upturned flange 131 adjacent to the slot 129 which is arranged at a slight angle so as to guide the bag top past the leading corner of a flange or jaw 132, provided upon a member 133 pivotally mounted on a plate 134 by a pivot 135. The plate 134 is shown secured to the upper face of a bracket 136 having its lower portion secured to the face of the bed plate 6. This bracket also provides a support for the side plates 14 and 15, constituting the side wall 13 of the conveyer. The pivoted member 133 is retained in its normal position, as shown in Figures 12, 13 and 26, by means of a tension spring 137 having one end secured to the member and its opposite end to a support 138, preferably secured to the bracket 136, as indicated at 139.

Figure 27:
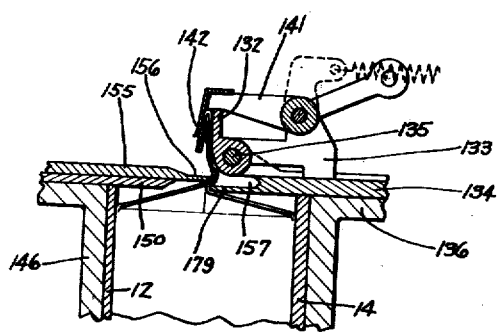

An arm 141 is pivotally mounted on the member 133 and has a jaw 142 adapted to cooperate with the jaw 132 to grip the partially folded bag top, as best shown in Figure 27. A connecting rod 143 has one end pivotally connected to the arm 141 and its opposite end to a bell crank 144, pivotally mounted on a bracket 145 secured to the upper end of a bracket 146 which is mounted on the bed plate 6, as shown in Figure 12. The bracket 146 also provides a support for the side wall 12 of the conveyer. A rod 147 has one end connected to the bell crank 144 and its opposite end to an arm 148, pivotally mounted on a cross member 149 secured to the longitudinal frame members 4 and 5. An anti-friction roller 151 is terminally mounted on the arm 148 and is adapted to ride on the periphery of a cam 152 secured to the operating shaft 49. The roller is retained in engagement with the cam 152 by means of a suitable tension spring 153.

Figure 13:
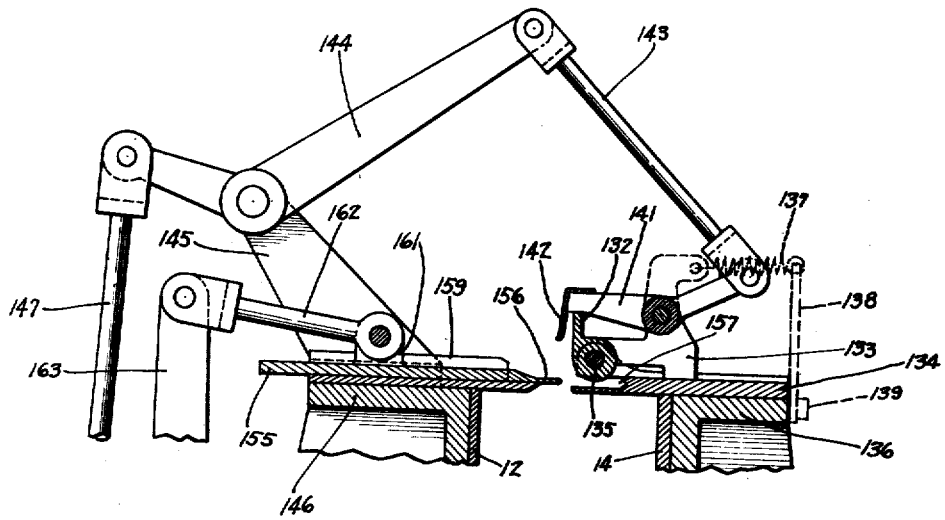
Figure 13 is a detail sectional view similar to Figure 12, with some of the parts omitted, showing the mechanism partially actuated.

When the high portion 154 of the cam 152 engages the roller 151, the arm 148 will be moved downwardly against the tension of the spring 153, thereby oscillating the bell crank 144, with the result that the movable jaw 142 will be moved to the position shown in Figures 13 and 27. When thus positioned, the bag top will be gripped between the jaws 132 and 142 as shown in Figure 27. However, before the roller 151 engages the high point of the cam 152, the pivoted member 133 will be tilted upon its pivot 135 to the position shown in Figures 14 and 28. At about the same time, a plate 155, which is slidably mounted in suitable guides provided on a plate 150 secured to the upper face of the bracket 146, is moved in a direction towards the jaws 132 and 142, causing the forward edge 156 thereof to engage the walls of the bag mouth, as shown in Figure 27. As the member 133 is tilted from the position shown in Figure 27 to that shown in Figure 28, the edge 156 of the plate 155 will push the bag top into a recess 157, provided beneath the pivot 135 of the member 133, as shown in Figure 29, thereby causing the upper folded portion 158 of the bag top to be withdrawn from the jaws 132 and 142 and be delivered into the recess 157, as shown in Figure 29. The leading edge 156 of the plate 155 will press the walls of the bag firmly against the V-shaped bottom of the recess 157, so as to crease the bag walls sufficiently to cause them to remain partially folded, when removed from the recess 157 and the plate 155 is disengaged therewith.

The plate 155 is mounted in suitable guides 159 and is provided with upstanding lugs 161 between which one end of a connecting rod 162 is mounted, the opposite end of which is connected to the long arm of a bell crank 163. The bell crank 163 is pivotally supported on a bracket 164 preferably secured to the side of the bed plate 6, as shown in Figures 12 and 13. An anti-friction roller 165 is provided upon the short end of the bell crank 163 and engages a cam 166 also secured to the operating shaft 49. The cam 166 has an inclined face 167 which first engages the roller 165 and causes the plate 155 to be moved to the position shown in Figure 27. Continued rotation of the cam 166 will cause the cam face 168 thereof to subsequently engage the roller 165, whereupon the plate 155 will be moved forwardly to the position shown in Figure 29. The high point 168 of the cam 166 is comparatively short so that the plate 155 will be returned to its normal position shortly after having been moved to its extreme forward position. The bell crank 163 has an extension 169 to which one end of a suitable spring 171 is connected, the opposite end of which is connected to the bed plate 6. This spring normally holds the roller 165 in engagement with the periphery of the cam 166.

It is to be understood that the conveyer operates intermittently, and is so timed with respect to the bag closing mechanisms as to cause the bags to come to rest at each station. As hereinbefore stated, the bag closing mechanisms operate only during the periods when the bags are temporarily at rest at the various stations. The operation of the jaws 132 and 142 is so timed with respect to the movement of the plate 155, that the jaws will grip the partially closed bag mouth substantially before the leading edge 156 of the plate 155 engages the bag walls, after which the member 133 is tilted from the position shown in Figure 27 to that shown in Figure 28. As soon as the leading edge 156 of the plate 155 engages the bag walls as shown in Figure 27, its forward movement will be temporarily interrupted because of the ineffective cam face provided between the inclined cam faces 167 and 168 of the cam 166, thereby permitting the jaws 132 and 142 to be tilted to the position shown in Figure 28, after which the plate 155 is advanced to complete its forward stroke, causing the leading edge thereof to push the partially closed bag top into the recess 157, as hereinbefore described, and as shown in Figure 29. The plate 155 is then returned to its normal position, as shown in Figure 12, because of the shape of the cam 166, thereby completing the second operation of closing the bag mouth.

*Third step (Figures 15, 16, 33, 34, and 35)*

From station B, the partially folded bag mouth is guided through a spirally shaped groove 172, formed between the raised portions 173 and 174, provided upon plates 175 and 176, respectively. The plates 175 and 176 are secured to the upper edges of the conveyer side walls 12 and 13 by such means as angle irons 177. The groove 172 is arranged to receive the partially folded bag top from the recess 157, when the bag top is in the position shown in Figure 29, and the leading edge 156 of the plate 155 is moved out of engagement with the bag top. The inner marginal portion 178 of the plate 176 is alined with the portion 179 of the plate 134 so that the bag top will be received in the groove 172 as the bag is advanced from station B to station C. The groove 172 functions to rotate the partially folded bag mouth substantially a quarter of a turn, or from the position shown in Figure 30 to that shown in Figure 32.

At station C, a plate 181 is slidably mounted in guides 182 provided on a bracket 183 secured to the bed plate 6 and to the side wall portions 14 and 15 of the conveyer. The forward end portion 184 of the plate 181 is bent upwardly at an incline, as shown in Figures 33, 34, and 35, and has a portion 185 adapted to engage an abutment screw 186, adjustably mounted in a bracket 187 secured to a plate 188 mounted for sliding movement in suitable guides 189 provided on a bracket 191, also secured to the bed plate 6 as best shown in Figures 15 and 16. The plate 188 is substantially alined with the plate 181 as shown in Figure 1.

A flexible guide plate 192 is secured to the plate 188 and normally has its free end spaced from the top face of the plate 188, as shown in Figure 33. The free end of this flexible plate is adapted to engage the partially folded bag top and retain it in the position shown in Figure 33, after the bag top leaves the spiral groove 172. The inclined portion 184 of the plate 181 is so arranged with respect to the walls of the groove 172 that the folded bag top may be moved from the groove 172 to a position between the inclined plate portion 184, as shown in Figure 33, without interference. As soon as the bag top reaches the position shown in Figure 33, the plate 181 will be moved in the direction indicated by the arrow in Figure 34, causing the bag top to be folded against the flexible guide plate 192 which will yield by the pressure of the bag top thereagainst, and will assume the position shown in Figure 34. Continued movement of the plate 184 will cause the plate 188 and guide member 192 to be moved out of engagement with the bag top, because of the portion 185 of the plate 181 engaging the abutment screw 186, causing the plate 188 to be moved simultaneously with the plate 181. When the parts reach the position shown in Figure 35, the folding of the bag top is completed, and the bag top will be closed as shown in Figure 37.

The means for operating the plate 181 is shown in Figures 15 and 16, and comprises a rod 194 having one end pivotally connected to the plate 181 and its opposite end to one end of an arm 195, pivoted at 196 to a bracket 197 secured to the bed plate 6. An antifriction roller 198 is provided at the lower end of the arm 195 and engages a cam 199 secured to the operating shaft 49. A spring 201 normally retains the roller 198 in engagement with the cam 199.

The plate 188 is yieldably retained in the position shown in Figure 15 by a suitable compression spring 202 coiled about a rod 203 having one end connected with the plate 188 by means of an eye-bolt 204 and its opposite end supported in a bracket 191. As soon as the plates 181 and 188 have been operated to complete the folding of the bag top as shown in Figure 35, the conveyer chain 18 is again operated to feed the bags forwardly in the conveyer, the closed bag being discharged from station C into the discharge end portion of the conveyer, which preferably has its top closed by means of a suitable plate 205, shown in Figure 36. This plate functions to retain the folded bag top in the closed position shown in Figure 36, and in which condition the bag may be delivered to a suitable sealing means such, for example, as is disclosed in my pending application, Serial Number 353,460, filed April 8, 1929.

Operation

In the operation of the machine, the bags, after having been previously filled with a suitable material such, for example, as flour, are delivered to the receiving end of the conveyer, as indicated by the dotted lines at the left hand side of Figure 1. The first bag fed into the machine will engage the trip finger 67 and move it to the dotted line position shown in Figure 1, thereby moving the lever 71 out of engagement with the dog 73 and permitting the spring 77 to move the detent 75 into engagement with the ratchet teeth 76, thereby locking the crank arm 74 to the gear 62. The gear 62, as hereinbefore stated, rotates continuously because of its driving connection with the pinion 61 secured to the end of the drive shaft 59. When the detent 75 engages the ratchet teeth 76, the operating shaft 49 will rotate synchronously with the gear 62, until the dog 73 again engages the end of the arm 71, whereupon the detent 75 will be moved out of driving engagement with the ratchet teeth 76 and the operating shaft 49 will come to rest in the position shown in Figure 3.

Each time the operating shaft 49 makes one complete revolution, the bag closing mechanisms at stations A, B, and C, will be operated to close the bag as hereinbefore described. The conveyer chain operates intermittently so as to feed the bags through the machine by a step by step movement. Each bag temporarily comes to rest at each station as it progressively travels through the machine. The bag closing mechanisms at the three stations are so arranged and connected to the driving means as to be operated only when the bags are at rest at the three stations. As soon as the bag closing mechanism at the three stations have been actuated, they are returned to their normal inoperative positions, whereupon the conveyer chain will be operated to again advance the bags in the machine or from one station to another.

I claim as my invention:

1. In a bag closing machine, the combination of means for feeding the bags, members for pressing the walls of the open bag top together in flat-wise relation, means associated with said members and adapted to transversely fold the compressed wall portions of the bag, and means for compressing the partially closed filled bag against said members to shape the bag.

2. In a bag closing machine, the combination of means for feeding the bags, members for pressing the walls of the open bag top together in flat-wise relation, means associated with said members and adapted to transversely fold the upper marginal portions of said compressed bag walls, and means for elevating the filled bag and compressing it against said members to shape the bag.

3. In a bag closing machine, the combination of means for feeding the bags, members for compressing the walls of the open bag top together in flat-wise relation, means associated with said members and adapted to transversely fold the compressed wall portion of the bag, and pressure means adapted to engage the bottom of the bag and compress the partially closed filled bag against said members to shape the bag.

4. In a bag closing machine, the combination of means for feeding the bags, members for pressing the walls of the open bag top together in flat-wise relation, means associated with said members and adapted to transversely fold the upper marginal portion of said compressed bag walls, and cam-actuated means adapted to elevate the filled bag and compress it against said members to shape the bottom and top of the bag.

5. In a bag closing machine, the combination of a conveyer adapted to feed the bags, members movably mounted over said conveyer and adapted to engage the walls of the open bag top, means for actuating said members to cause them to press said walls together in flat-wise relation, means on said members adapted to make a transverse fold in the bag top walls, and means for relatively moving said members while the bag walls are compressed therebetween, whereby said transverse folding means will operate to transversely fold the compressed bag top walls, 6. In a bag closing machine, the combination of a conveyer adapted to feed the bags, members movably mounted over said conveyer and adapted to engage the side walls of the open bag top, means for actuating said members to cause them to press said side walls together in flat-wise relation with the end walls folded between the side walls, and cooperating means on said members capable of making a transverse fold in the walls of the bag mouth while said walls are compressed between said members.

7. In a bag closing machine, the combination of a conveyer for feeding the bags, means for folding the end walls of the open bag top inwardly between the side walls thereof, members for pressing the side walls of the open bag top together against said folded end walls, a groove in one of said members, a tongue on the other of said members adapted to be received in said groove, and means for relatively moving said members to cause said tongue to force portions of said compressed walls into said groove to transversely fold the bag top.

8. In a machine for closing filled bags, the combination of a conveyer adapted to feed the bags, end wall folding members adapted to engage the end walls of the open bag top and fold them inwardly, side wall folding members adapted to engage and press the side walls of the bag top inwardly against said folded end walls, and means connected with said side wall folding members adapted to transversely fold the upper marginal portions of said bag top walls, while said walls are compressed between said side wall folding members.

9. In a machine for closing filled bags, the combination of a conveyer adapted to feed the bags, end wall folding members adapted to engage the end walls of the open bag top and fold them inwardly between the opposed side walls thereof, side wall folding members adapted to engage and press the side walls of the bag top inwardly against said folded end walls, and a tongue-and-groove device associated with said side wall folding members capable of being rendered operative by relative movement of said side wall folding members, while the bag walls are compressed therebetween to transversely fold the upper marginal portions of the compressed bag top walls.

10. In a bag closing machine, the combination of a conveyer adapted to feed the bags, mechanisms located adjacent to said conveyer in spaced relation, one of said mechanisms comprising means for folding the walls of the bag top inwardly and pressing them together in flat-wise relation and forming a transverse fold in said walls, and another mechanism having means for making a plurality of transverse folds in the compressed wall portions of the bag top, whereby the top edges of the bag mouth walls will be concealed within said folds in leak-proof relation.

11. In a bag closing machine, the combination of a conveyer adapted to feed the bags, mechanisms located adjacent to said conveyer in spaced relation, one of said mechanisms comprising pivoted means for folding the walls of the bag top inwardly and pressing them together in flat-wise relation and forming a transverse fold in said walls, and another mechanism comprising oppositely movable members adapted to engage the partially folded bag top and further fold it whereby the top edges of the bag mouth walls will be concealed within said folds in leak-proof relation.

12. In a bag closing machine, a conveyer, end wall folding members mounted for swinging movement over said conveyer in a direction lengthwise thereof and adapted to fold the end walls of the open bag top inwardly, side wall folding members mounted for swinging movement transversely of the conveyer and adapted to engage and press the side walls of the open bag top inwardly against said folded end walls, and means carried by said side wall folding member adapted to transversely fold the upper portions of the bag top walls.

13. In a bag closing machine, a conveyer, end wall folding members mounted for swinging movement over said conveyer in a direction lengthwise thereof and adapted to fold the end walls of the open bag top inwardly, side wall folding members mounted for swinging movement transversely of the conveyer and adapted to engage and press the side walls of the open bag top inwardly against said folded end walls, a groove in one of said side wall folding members and a tongue in the other of said members, and means for operating said side wall folding members to cause said tongue to cooperate with said groove to form a fold in the pressed-together bag top walls.

14. In a bag closing machine, the combination of a conveyer adapted to feed the bags through the machine, means for intermittently operating said conveyer, means for folding the end walls of the open bag top inwardly, side wall folding members adapted to press the side walls of the open bag top together against said folded end walls in flat-wise relation, and means for applying pressure to the top and bottom of the partially closed bag to shape the bag.

15. In a bag closing machine, the combination of a conveyer adapted to feed the bags through the machine, means for intermittently operating said conveyer, means for folding the end walls of the open bag top inwardly, side wall folding members adapted to press the walls of the open bag top together against said folded end walls in flat-wise relation, means for moving the bag upwardly against said members to shape the bag while the bag walls are compressed between said members, and means for transversely folding said compressed wall portions.

16. In a bag closing machine, the combination of a conveyer having a plurality of folding mechanisms mounted adjacent thereto and operating in timed relation, one of said mechanisms having means for pressing the walls of the open bag top together in flatwise relation and forming a transverse fold in the upper portions thereof, and a second mechanism comprising a plate mounted for sliding movement and cooperating with means to further transversely fold said partially folded wall portions to close the bag.

17. In a bag closing machine, the combination of a conveyer having a plurality of folding mechanisms mounted adjacent thereto and operating in timed relation, one of said mechanisms being adapted to fold the end and side walls of the open bag top together in flat-wise relation and transversely fold the upper marginal portions thereof, a second mechanism comprising a pair of jaws adapted to grip the partially folded bag top and further fold said partially folded wall portions, and a plate mounted for sliding movement transversely of the conveyer.

18. In a machine for closing bags having end and side walls, the combination of means for feeding the bags, end wall folding members adapted to engage and fold the end walls inwardly between said side walls, means for pressing the side walls together against said folded end walls and transversely folding the upper marginal portions of the compressed bag walls, jaws mounted to receive and grip said partially folded bag top and having a recess located adjacent thereto, and a plate mounted for sliding movement and adapted to engage the compressed bag walls and force them into said recess to further transversely fold the bag top.

19. In a machine for closing bags having end and side walls, the combination of means for feeding the bags, means for folding the end walls inwardly, means for pressing the side walls together against said folded end walls, a tongue-and-groove device adapted to transversely fold the upper marginal portion of said compressed bag walls, jaws mounted to receive the partially folded bag walls and having a recess located therebeneath, said jaws being mounted for tilting movement without imparting relative movement between the jaws, and a movable plate having a portion adapted to engage the compressed bag walls and force them into said recess to further transversely fold the walls of the bag top.

20. In a machine for closing bags having end and side walls, the combination of a conveyer adapted to feed the bags, cam-actuated folding members adapted to engage and fold the end walls inwardly between said side walls, means for pressing the side walls together against said folded end walls and transversely folding the upper marginal portion of the compressed bag walls, a frame pivotally mounted adjacent to said conveyer and having a fixed jaw, a relatively movable jaw in said frame cooperable with said fixed jaw to grip the transversely folded portion of the bag top, and means beneath said frame adapted to cooperate with said jaws to further transversely fold the bag top.

21. In a machine for closing bags having end and side walls, the combination of a conveyer adapted to feed the bags, means for folding the end walls inwardly, means for pressing the side walls together against said folded end walls, a tongue-and-groove device adapted to transversely fold the upper marginal portion of said compressed bag wall, a frame pivotally mounted over said conveyer and having a fixed jaw, a relatively movable jaw on said frame cooperable with said fixed jaw to grip the transversely folded portion of the bag top, means for tilting said frame whereby said jaws are tilted to bend the compressed wall portions of said bag top, and means adapted to receive the compressed wall portions from said jaws and further transversely fold them.

22. In a machine for closing bags having end and side walls, the combination of a conveyer adapted to feed the bags, means for folding the end walls inwardly, means for pressing the side walls together against said folded end walls in flat-wise relation, a tongue-and-groove device adapted to transversely fold the upper marginal portion of said compressed bag walls, jaws cooperating with a movable plate to further transversely fold the walls of the bag top, and a pair of plates adapted to engage the partially folded bag top and complete the transverse folding of the bag top, whereby the walls of the bag top will be folded against the material contained in said bag.

23. In a machine for closing bags having end and side walls, the combination of a conveyer adapted to feed the bags, means for folding the end walls inwardly, means for pressing the side walls together against said folded end walls in flat-wise relation, a tongue-and-groove device adapted to transversely fold the upper marginal portion of said compressed bag walls, jaws mounted to grip the transversely folded portion of the bag top and cooperating with a movable plate to further transversely fold the bag top, plates spaced apart to receive between them said partially folded bag top, and means for actuating said plates to cause them to complete the transverse folding of the bag top.

24. In a machine for closing paper bags having end and side walls, the combination of a conveyer adapted to intermittently feed the bags through the machine, means for folding the walls of the bag top together in flat-wise relation and adapted to make a single transverse fold in the upper marginal portions of said walls, jaws adapted to grip the upper partially folded portion of the bag top, a movable plate cooperating with said jaws to provide a second fold in the walls of the bag top, a spiral groove adapted to receive the partially folded bag top from said jaws and deliver it to a mechanism adapted to make the final transverse fold in the bag top to complete the operation of closing the bag.

25. In a machine for closing bags having end and side walls, the combination of a conveyer adapted to intermittently feed the bags through the machine, means for folding the walls of the bag top together in flat-wise relation and adapted to make a single transverse fold in the upper marginal portions of said walls, jaws adapted to grip the upper partially folded portion of the bag top, and having a recess located therebeneath, a movable plate adapted to be received in said recess and cooperating with said jaws to provide a second fold in the walls of the bag top, a spiral groove for guiding the partially folded bag top from said jaws to a third folding mechanism adapted to make the final transverse fold in the bag top to complete the operation of closing the bag.

26. In a machine for closing bag tops having end and side walls, the combination of a conveyer for feeding the bags, means for folding the end and side walls inwardly and pressing them together and in flat-wise relation and forming a transverse fold in the upper marginal portions thereof, jaws mounted to receive said partially folded bag top walls and having a recess arranged therebeneath lengthwise of the conveyer, a plate mounted for horizontal movement in a direction transversely of the conveyer and adapted to force the partially folded bag top walls into said recess to further transversely fold the bag top, a spiral groove arranged to receive the partially folded bag top and to rotate the transversely folded portion of the bag and deliver it to a mechanism adapted to complete the transverse folding of the bag top, said mechanism comprising a plate adapted to engage the bag walls and having a resilient element mounted thereon adapted to engage the partially folded bag top walls to prevent unfolding thereof, and a member mounted for sliding movement over said plate and adapted to engage the upstanding partially folded bag top walls and fold them to horizontal positions against said resilient element, continued movement of said sliding member causing said plate and resilient element to be moved out of engagement with the walls of the bag, whereupon the operation of closing the bag top is completed.

27. In a machine for closing bag tops having end and side walls, the combination of a conveyer for feeding the bags, means for folding the end and side walls inwardly in flat-wise relation and transversely folding the upper marginal edges of the bag walls, jaws mounted to receive said partially folded bag top and having a groove arranged therebeneath lengthwise of the conveyer, a plate mounted for sliding movement in a direction transversely of the conveyer and adapted to force the partially folded bag walls into said recess to further transversely fold the bag top, a spiral groove arranged to receive the transversely folded portion of the bag top and to rotate it from a horizontal to an upright position, a plate having a portion normally overhanging the conveyer and adapted to engage the bag walls, a resilient element mounted on said plate and adapted to engage the transversely folded portion of the bag top to prevent unfolding thereof, and a member mounted for sliding movement over said plate and adapted to engage the upstanding partially folded bag top and fold it to a horizontal position against said resilient element, said element yielding under pressure of the bag top, and continued movement of said sliding member causing said plate and resilient element to be moved out of engagement with the walls of the bag, whereupon the operation of closing the bag top is completed.

28. In a machine for closing bags having end and side walls, the combination of a conveyer adapted to feed the bags, end wall folding members mounted for swinging movement lengthwise of the conveyer and adapted to engage said end walls and fold them inwardly, cam-actuated toothed means connecting together said end wall folding members whereby they will operate simultaneously and in opposite directions, side wall folding members mounted to swing transversely of said conveyer and adapted to fold said side walls inwardly against said partially folded end walls, and means carried by said side wall folding members adapted to transversely fold the upper marginal portions of the bag top walls.

29. In a bag closing machine, the combination of means for pressing the walls of the bag top together in flat-wise relation, means for transversely folding said wall portions while held between said pressing means, and means adapted to exert pressure against the walls of the bag body to shape the bag.

30. In a bag closing machine, the combination of means for feeding the bags, means for pressing the walls of the bag top together in flat-wise relation, means for transversely folding said wall portions while held between said pressing means, and means adapted to exert pressure against the walls of the bag body to shape the bag while the bag top walls are held between said pressing means.

31. In a bag closing machine, the combination of means for feeding the bags, means for pressing the walls of the bag top together in flat-wise relation, means for transversely folding the compressed wall portions of the bag top, and means for exerting pressure against the bag to shape it.

32. In a bag closing machine, the combination of means for feeding the bags, members for folding the top bag walls together in flat-wise relation, means on said members for transversely folding the pressed together top bag walls, and means for exerting a pressure against the top and bottom of the bag while the top wall portions thereof are compressed between said members.

33. In a bag closing machine, the combination of means for intermittently feeding the bags, end wall folding members adapted to fold inwardly the end walls of the bag, side wall folding members adapted to press the side walls of the bag top together against said inwardly folded end walls in flat-wise relation, a groove on one of said side wall folding members, a knife-edge on the other of said side wall folding members, means for actuating said side wall folding members to cause said groove and knife edge to form a transverse fold in the compressed wall portions of the bag top, while said wall portions are held by said members, and means for exerting pressure against the bag walls to shape the bag.

In witness whereof, I have hereunto set my hand this 13th day of July, 1929.

HELMER ANDERSON

DISCLAIMER 1,772,824.—*Helmer Anderson*, Minneapolis, Minn. BAG-CLOSING MACHINE. Patent dated August 12, 1930. Disclaimer filed May 17, 1943, by the inventor; the assignee, *General Mills, Inc.*, assenting.

Hereby enters this disclaimer to claim 14 of the above patent.

(This disclaimer correcting error as to patent number supersedes disclaimer published in Official Gazette June 15, 1943.)

31. In a bag closing machine, the combination of means for feeding the bags, means for pressing the walls of the bag top together in flat-wise relation, means for transversely folding the compressed wall portions of the bag top, and means for exerting pressure against the bag to shape it.

32. In a bag closing machine, the combination of means for feeding the bags, members for folding the top bag walls together in flat-wise relation, means on said members for transversely folding the pressed together top bag walls, and means for exerting a pressure against the top and bottom of the bag while the top wall portions thereof are compressed between said members.

33. In a bag closing machine, the combination of means for intermittently feeding the bags, end wall folding members adapted to fold inwardly the end walls of the bag, side wall folding members adapted to press the side walls of the bag top together against said inwardly folded end walls in flat-wise relation, a groove on one of said side wall folding members, a knife-edge on the other of said side wall folding members, means for actuating said side wall folding members to cause said groove and knife edge to form a transverse fold in the compressed wall portions of the bag top, while said wall portions are held by said members, and means for exerting pressure against the bag walls to shape the bag.

In witness whereof, I have hereunto set my hand this 13th day of July, 1929.

HELMER ANDERSON

DISCLAIMER 1,772,824.—*Helmer Anderson*, Minneapolis, Minn. BAG-CLOSING MACHINE. Patent dated August 12, 1930. Disclaimer filed May 17, 1943, by the inventor; the assignee, *General Mills, Inc.*, assenting.

Hereby enters this disclaimer to claim 14 of the above patent.

(This disclaimer correcting error as to patent number supersedes disclaimer published in Official Gazette June 15, 1943.)